Feb. 4, 1969 A. J. RAPIER 3,425,711
LEG RESTS FOR AUTOMOBILES
Filed June 24, 1966 Sheet 1 of 2
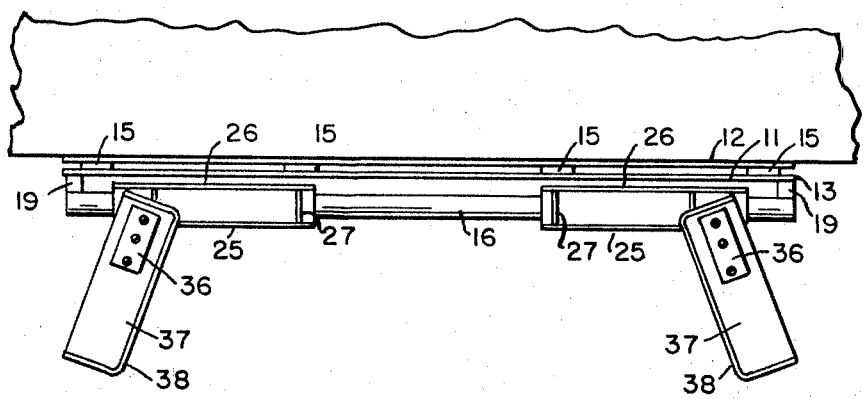
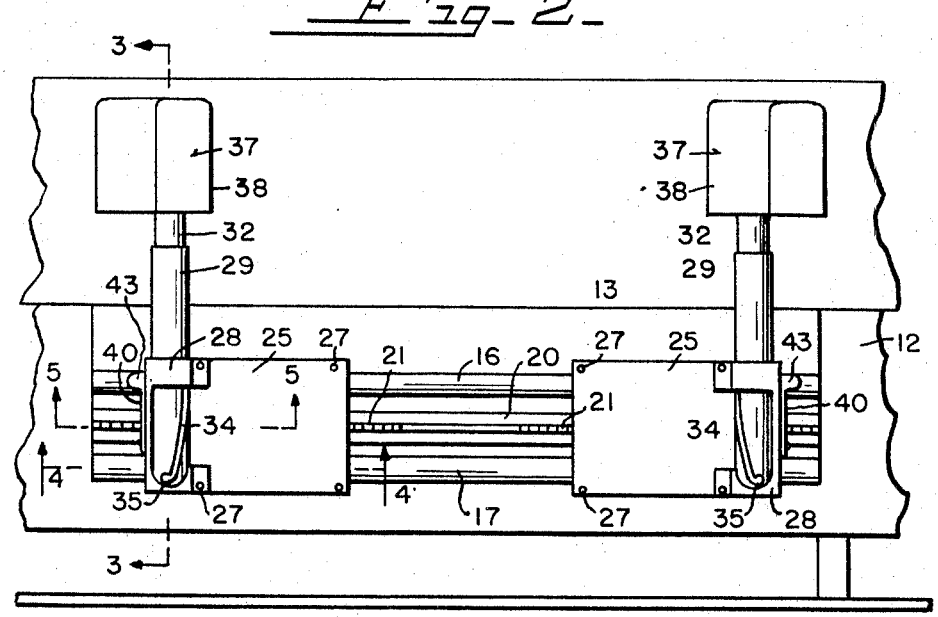
INVENTOR
ANDREW J. RAPIER
BY
ATTORNEY.

Feb. 4, 1969
A. J. RAPIER
3,425,711
LEG RESTS FOR AUTOMOBILES
Filed June 24, 1966
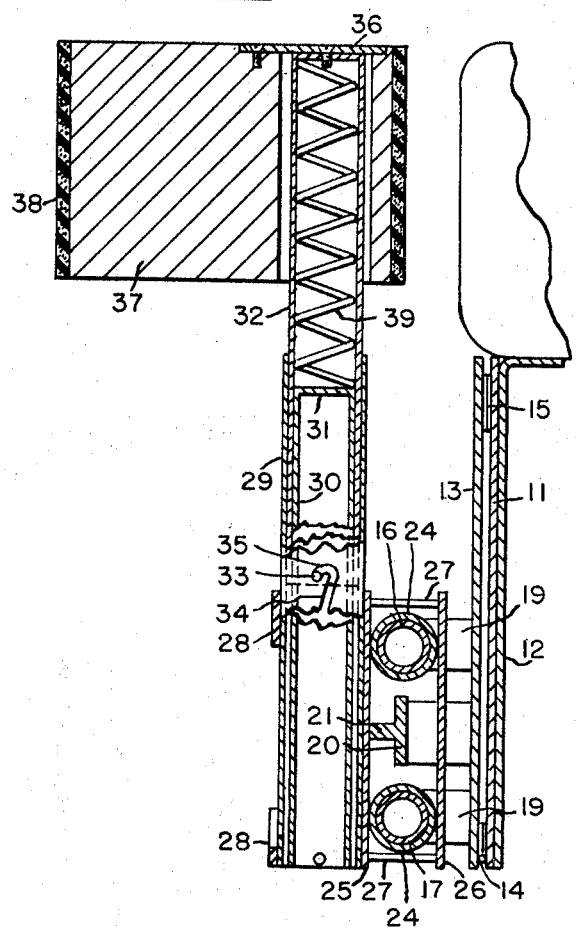
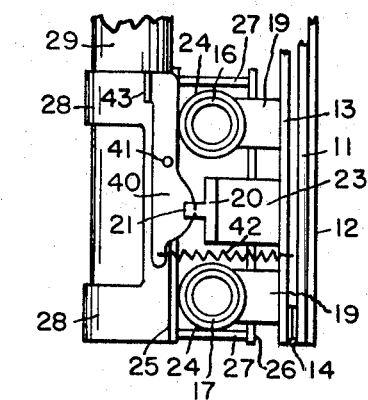
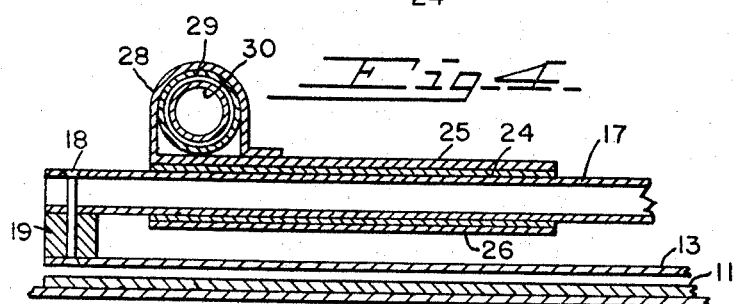
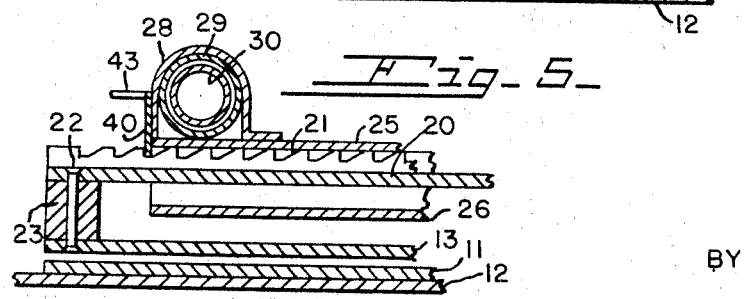
INVENTOR
ANDREW J. RAPIER
BY *H.C. Kavel*
ATTORNEY.

United States Patent Office 3,425,711
Patented Feb. 4, 1969

3,425,711
LEG RESTS FOR AUTOMOBILES
Andrew J. Rapier, Cincinnati, Ohio
(Rte. 1, Box 364, Fayetteville, Ohio 45118)
Filed June 24, 1966, Ser. No. 560,318
U.S. Cl. 280—150
Int. Cl. B60n 3/06
3 Claims

ABSTRACT OF THE DISCLOSURE

Adjustable leg rests for the driver of an automobile.

This invention relates to leg rests for the driver of an automobile. The driver of an automobile, especially in long trips often becomes leg weary and my invention is designed to permit the driver to adjust the leg rests to his convenience permitting the legs to rest against the rests for easy driving. The rests are adjustable to place the rests in any desired position and when not in use can be depressed to a position below the seat with the rests rotated to an out of the way position.

The object of my invention is to provide adjustable leg rests supported on the face of the front seat on the driver's side of the automobile.

A further object is to provide retractable means for moving the leg rests away from a leg rest position when not in use.

A further object is to provide means for holding the leg rests in adjusted position.

A further object is to provide means for releasing the entire structure in case of an accident to drop the structure to the floor of the automobile.

My invention will be further readily understood from the following description and claims, and from the drawings, in which latter:

FIG. 1 is a plan view of my improved leg rests.
FIG. 2 is a front view of the same.
FIG. 3 is an enlarged vertical section of one of the leg rests, taken in the plane of the line 3—3 of FIG. 2.
FIG. 4 is an enlarged horizontal section, partly broken away and taken in the plane of the line 4—4 of FIG. 2.
FIG. 5 is an enlarged horizontal section, partly broken away and taken in the plane of the line 5—5 of FIG. 2.
FIG. 6 is a side view, partly broken away, showing the latch.

My improved leg rests are mounted on a panel 11 suitably secured to the front seat support 12 on the driver's side of an automobile. A second panel 13 is hinged to the panel 11 along the lower edge as indicated at 14 and this second panel 13 is held to the panel 11 by means of magnets 15. Guide tubes 16 and 17 extend horizontally in spaced relation the length of the panel 13 and are attached to the panel 13 by rivets 18 and spacers 19 to support the tubes in spaced relation to the panel 13. Between the guide tubes is a bar 20 having a center notched portion 21 and attached to the plate 13 by rivets 22 and spacers 23. Tubes 24 secured to plates 25 and 26 are slidable on the tubes 16 and 17. The plates 25 and 26 being secured together with rivets 27. The ends 28 of the plates 25 are bent around vertical tubes 29 and attached thereto to hold the tubes 29 in position. Tubes 30 of less diameter than the inside of the tubes 29 extend upwardly within the tubes 29 and are closed at their upper ends as at 31. These tubes 30 are secured to the tubes 29 at their base. Tubes 32 are slidable between the tubes 29 and 30 and are provided with pins 33 engaging spiral slots 34 in the tubes 29. The slots have notches 35 at their respective ends to hold the tubes 32 in either up or down position.

The upper ends of the tubes 32 are closed and plates 36 are attached thereto to support the leg rests 37 which may be covered with suitable pads 38. Springs 39 are interposed between the closed ends of the tubes 30 and 32. The leg rests, which are spring loaded, when pushed down rotate outwardly by the action of the pins 33 in the spiral slots 34 and the leg rests are held in either up or down position by the pins 33 engaging the notches 35.

Latches 40 are pivoted as at 41 to the tubes 29 and engage the notches 21 in the bar 20 to hold the leg rests in horizontal adjusted position. Springs 42 maintain the latches in engagement with the notches. The leg rests can be moved inwardly by merely pushing on their faces with the latches snapping over the notches to a suitable position and latches will hold them in such position. When it is desired to move the leg rests outwardly, the extension 43 is depressed to raise the latches out of engagement with the notches.

From the foregoing, it will be seen that I have devised a leg rest that can easily be adjusted to suit the driver and brought into resting position or the leg rests can be pushed down and away from the legs when not in use.

Having thus fully described my invention, what I claim as new and desire to secure by Letters Patent is:

1. Leg rests for an automobile comprising;
   (a) a structure below the seat of the automobile consisting of a panel hinged to a panel secured to the seat support,
   (b) horizontal guides attached to the hinged panel,
   (c) members adjustable horizontally on said guides, and
   (d) leg rests vertically movable on said members.

2. Leg rests for an automobile as set forth in claim 1, including means for rotating said leg rests as they are moved downwardly out of operative position.

3. Leg rests for an automobile as set forth in claim 1, including spring means for extending said leg rests and a spiral slot engaging a pin for turning said rests outwardly when retracted and means for holding said rests in extended or retracted position.

References Cited

UNITED STATES PATENTS 2,749,973   6/1956   Leasy _____ 155—172

BENJAMIN HERSH, *Primary Examiner.*
JOEL E. SIEGEL, *Assistant Examiner.*